US007839111B2

(12) United States Patent
Kojima

(10) Patent No.: US 7,839,111 B2
(45) Date of Patent: Nov. 23, 2010

(54) STEPPER MOTOR CONTROL APPARATUS

(75) Inventor: Saki Kojima, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 338 days.

(21) Appl. No.: 12/177,759

(22) Filed: Jul. 22, 2008

(65) Prior Publication Data

US 2009/0039823 A1 Feb. 12, 2009

(30) Foreign Application Priority Data

Aug. 9, 2007 (JP) .......................... P2007-207839

(51) Int. Cl.
*H02P 8/38* (2006.01)

(52) U.S. Cl. .................. 318/685; 318/696; 318/400.32; 318/400.34

(58) Field of Classification Search ................. 318/685, 318/696, 400.32, 400.34; 700/69
See application file for complete search history.

(56) References Cited

U.S. PATENT DOCUMENTS

| | | | | |
|---|---|---|---|---|
| 4,214,823 | A * | 7/1980 | Pritchard | 352/87 |
| 4,262,336 | A * | 4/1981 | Pritchard | 700/169 |
| 4,449,196 | A * | 5/1984 | Pritchard | 708/670 |
| 5,689,165 | A * | 11/1997 | Jones et al. | 318/701 |
| 5,770,937 | A * | 6/1998 | Tsuda et al. | 318/685 |
| 5,844,385 | A * | 12/1998 | Jones et al. | 318/400.32 |
| 6,809,438 | B2 * | 10/2004 | Suzuki et al. | 310/49.36 |
| 2009/0243526 | A1 * | 10/2009 | Ito et al. | 318/400.34 |

FOREIGN PATENT DOCUMENTS

JP 2001-91302 4/2001

* cited by examiner

*Primary Examiner*—Paul Ip
(74) *Attorney, Agent, or Firm*—Finnegan, Henderson, Farabow, Garrett & Dunner, L.L.P.

(57) ABSTRACT

A stepper motor apparatus controls a stepper motor by taking a maximum response speed and maximum response acceleration of the stepper motor into account.

5 Claims, 12 Drawing Sheets

FIG. 12

| NORMAL OUTPUT | | | 1/2 CORRECTION | | | 1/4 CORRECTION | | |
|---|---|---|---|---|---|---|---|---|
| TIME | NUMBER OF REFERENCE STEPS | ROTATIONAL ANGLE OF STEPPER MOTOR 6 | TIME | NUMBER OF REFERENCE STEPS | ROTATIONAL ANGLE OF STEPPER MOTOR 6 | TIME | NUMBER OF REFERENCE STEPS | ROTATIONAL ANGLE OF STEPPER MOTOR 6 |
| T0 | 0 | 0 | T0 | 0 | 0/2 | T0 | 0 | 0/4 |
| | | | | | | T1 | 0 | 0/4 |
| | | | T2 | 0 | 0/2 | T2 | 0 | 0/4 |
| | | | | | | T3 | 0 | 0/4 |
| T4 | 1 | 1 | T4 | 1 | 1/2 | T4 | 1 | 1/4 |
| | | | | | | T5 | 1 | 2/4 |
| | | | T6 | 1 | 2/2 | T6 | 1 | 3/4 |
| | | | | | | T7 | 1 | 4/4 |
| T8 | 2 | 3 | T8 | 2 | 4/2 | T8 | 2 | 6/4 |
| | | | | | | T9 | 2 | 8/4 |
| | | | T10 | 2 | 6/2 | T10 | 2 | 10/4 |
| | | | | | | T11 | 2 | 12/4 |
| T12 | 3 | 6 | T12 | 3 | 9/2 | T12 | 3 | 15/4 |
| | | | | | | T13 | 3 | 18/4 |
| | | | T14 | 3 | 12/2 | T14 | 3 | 21/4 |
| | | | | | | T15 | 3 | 24/4 |
| T16 | 4 | 10 | T16 | 4 | 16/2 | T16 | 4 | 28/4 |
| | | | | | | T17 | 4 | 32/4 |
| | | | T18 | 4 | 20/2 | T18 | 4 | 39/4 |
| | | | | | | T19 | 4 | 40/4 |

FIG. 15

| TIME | TARGET ANGLE | NORMAL OUTPUT | | | | | CORRECTION OUTPUT | | | | |
|---|---|---|---|---|---|---|---|---|---|---|---|
| | | OUTPUT ANGLE OF PRE-PROCESSING CYCLE | NUMBER OF REFERENCE STEPS OF PRE-PROCESSING CYCLE | REMAINING ANGLE | NUMBER OF REFERENCE STEPS | | OUTPUT ANGLE OF PRE-PROCESSING CYCLE | NUMBER OF REFERENCE STEPS OF PRE-PROCESSING CYCLE | REMAINING ANGLE | NUMBER OF REFERENCE STEPS | |
| | | | | | INCREASE | DECREASE | | | | INCREASE | DECREASE |
| T0 | 0 | 0 | 0 | 0 | 0 | 0 | 0 | 0 | 0 | 0 | 0 |
| T1 | 0 | 0 | 0 | 0 | 0 | 0 | 0 | 0 | 0 | 0 | 0 |
| T2 | 0 | 0 | 0 | 0 | 0 | 0 | 0 | 0 | 0 | 0 | 0 |
| T3 | 0 | 0 | 0 | 0 | 0 | 0 | 0 | 0 | 0 | 0 | 0 |
| T4 | 1 | 0 | 0 | 1 | 1 | 0 | 0 | 0 | 1 | 1 | 0 |
| T5 | 1 | 1 | 1 | 0 | 0 | 1 | 1 | 1 | 0 | 0 | 1 |
| T6 | 1 | 1 | 0 | 0 | 0 | 0 | 1 | 0 | 0 | 0 | 0 |
| T7 | 1 | 1 | 0 | 0 | 0 | 0 | 1 | 0 | 0 | 0 | 0 |
| T8 | 4 | 1 | 0 | 3 | 1 | 0 | 1 | 0 | 3 | 1 | 0 |
| T9 | 4 | 2 | 1 | 2 | 0 | 0 | 2 | 1 | 2 | 0 | 0 |
| T10 | 4 | 3 | 1 | 1 | 0 | 0 | 3 | 1 | 1 | 0 | 0 |
| T11 | 4 | 4 | 1 | 0 | 0 | 1 | 4 | 1 | 0 | 0 | 1 |
| T12 | 9 | 4 | 0 | 5 | 1 | 0 | 4 | 0 | 5 | 1 | 0 |
| T13 | 9 | 5 | 1 | 4 | 1 | 0 | 5 | 1 | 4 | 0 | 0 |
| T14 | 9 | 7 | 2 | 2 | 0 | 1 | 6 | 1 | 3 | 0 | 0 |
| T15 | 9 | 8 | 1 | 1 | 0 | 0 | 7 | 1 | 2 | 0 | 0 |
| T16 | 16 | 9 | 1 | 7 | 1 | 0 | 8 | 1 | 8 | 1 | 0 |
| T17 | 16 | 11 | 2 | 5 | 0 | 0 | 9 | 1 | 7 | 0 | 0 |
| T18 | 16 | 13 | 2 | 3 | 0 | 0 | 10 | 1 | 6 | 0 | 0 |
| T19 | 16 | 15 | 2 | 1 | 0 | 1 | 11 | 1 | 5 | 0 | 0 |
| T20 | 25 | 16 | 1 | 9 | 1 | 0 | 12 | 1 | 13 | 1 | 0 |
| T21 | 25 | 18 | 2 | 7 | 1 | 0 | 14 | 2 | 11 | 0 | 0 |
| T22 | 25 | 21 | 3 | 4 | 0 | 1 | 16 | 2 | 9 | 0 | 0 |
| T23 | 25 | 23 | 2 | 2 | 0 | 1 | 18 | 2 | 7 | 0 | 0 |
| T24 | 36 | 24 | 1 | 12 | 1 | 0 | 20 | 2 | 16 | 0 | 0 |
| T25 | 36 | 26 | 2 | 10 | 1 | 0 | 22 | 2 | 14 | 0 | 0 |
| T26 | 36 | 29 | 3 | 7 | 0 | 0 | 24 | 2 | 12 | 0 | 0 |
| T27 | 36 | 32 | 3 | 4 | 0 | 1 | 26 | 2 | 10 | 0 | 0 |
| T28 | 49 | 34 | 2 | 15 | 1 | 0 | 28 | 2 | 21 | 1 | 0 |
| T29 | 49 | 37 | 3 | 12 | 1 | 0 | 31 | 3 | 18 | 0 | 0 |
| T30 | 49 | 41 | 4 | 8 | 0 | 1 | 34 | 3 | 15 | 0 | 0 |
| T31 | 49 | 44 | 3 | 5 | 0 | 1 | 37 | 3 | 12 | 0 | 0 |

STEPPER MOTOR CONTROL APPARATUS

CROSS REFERENCE TO RELATED APPLICATION

This application claims benefit of priority under 35 USC 119 based on Japanese Patent Application P2007-207839 filed Aug. 9, 2007, the entire contents of which are incorporated by reference herein.

BACKGROUND OF THE INVENTION

1. Field of the Invention

The present invention relates to a stepper motor control apparatus.

2. Description of the Related Art

Japanese Patent Application Laid-Open No. 2001-91302 (hereinafter called Patent Document 1) describes a stepper motor control apparatus for controlling rotation of a stepper motor. This stepper motor control apparatus prevents stepping-out of the stepper motor by rotating the stepper motor for each predetermined update period, and reducing a rotational amount of the stepper motor for each update period.

SUMMARY OF THE INVENTION

A stepper motor has a maximum response speed and maximum response acceleration as its characteristics. When the stepper motor is rotated at a speed over the maximum response speed or accelerated at acceleration over the maximum response acceleration, stepping-out of the stepper motor easily occurs. Thus, it is advisable to control the stepper motor by taking its maximum response speed and maximum response acceleration into account. However, as a conventional stepper motor control apparatus does not perform control with consideration given to a maximum response speed or maximum response acceleration of a stepper motor, the control apparatus has yet to achieve an object of preventing stepping-out of the stepper motor.

The present invention has been developed to solve the aforementioned problem, and is directed to a stepper motor control apparatus which can prevent stepping-out of a stepper motor more surely than the conventional stepper motor control apparatus.

According to an aspect of the present invention, a stepper motor control apparatus includes condition determination device determining a first condition to satisfy both of equations (1) and (2) below, and a second condition to satisfy an equation (3) below, reference step number calculation device calculating, if the first condition is satisfied, the number of reference steps which is a reference value for a rotational direction and a step amount of a stepper motor as a value larger by one step than the number of reference steps of a previous processing cycle in an approaching direction in which a difference between an angle obtained by accumulating the numbers of reference steps and a target angle of the stepper motor is reduced, calculating, if the second condition is satisfied, the number of reference steps as a value smaller by one step than the number of reference steps of the previous processing cycle in the approaching direction, and calculating, if neither of the first and second conditions is satisfied, the number of reference steps as a value equal to the number of reference steps of the previous processing cycle, for each passage of an update period which satisfies an equation (4) below, $$(|V(N-1)|+1)*(|V(N-1)|+2)/2 \leqq |\mathrm{DISTANCE}| \quad (1),$$

$$|V(N-1)|<V\_\mathrm{MAX} \quad (2),$$

$$|V(N-1)|*(|V(N-1)|+1)/2>|\mathrm{DISTANCE}| \quad (3),$$

$$t \geqq (\theta k/a\_\mathrm{MAX})\hat{}(1/2) \quad (4),$$

where V(N−1) is number of reference stops of previous processing cycle, DISTANCE is a value obtained by subtracting angle obtained by accumulating numbers of reference steps from target angle of stepper motor and represented by step unit, V_MAX is a maximum step amount which enables rotation of stepper motor at one update period, t is update period, θk is an angle of one step, a_MAX is maximum response acceleration of stepper motor;

and stepper motor driving device rotating, for each passage of the update period, the stepper motor by a step amount indicated by the number of reference steps of a current processing cycle in a direction indicated by the number of reference steps of the current processing cycle.

FIG. 6 illustrates a basic operation of the stepper motor control apparatus of the present invention. In FIG. 6, a target angle is θ1 (step) at time T0, and 0 (step) at time T6. In this case, an output angle (angle obtained by accumulating the numbers of reference steps) increases toward θ1, and similarly decreases toward 0 thereafter.

According to the present invention, as control is carried out by taking the maximum response speed and the maximum response acceleration of the stepper motor into account, stepping-out of the stepper motor can be prevented more surely than the conventional stepper motor control apparatus.

BRIEF DESCRIPTION OF THE DRAWINGS

FIG. 12 is a table illustrating a relation between an output angle of the third embodiment and an output angle of the first embodiment.

FIG. 15 is a table illustrating a relation between an output angle of the fourth embodiment and an output angle of the first embodiment.

DESCRIPTION OF THE EMBODIMENTS

First Embodiment

Figure 1:
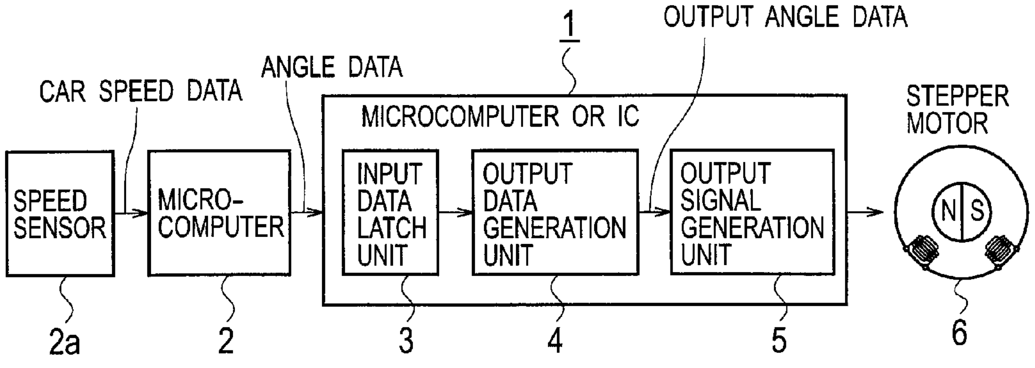
FIG. 1 is a block diagram illustrating a configuration of a stepper motor control apparatus according to a first embodiment of the present invention.
Figure 2:
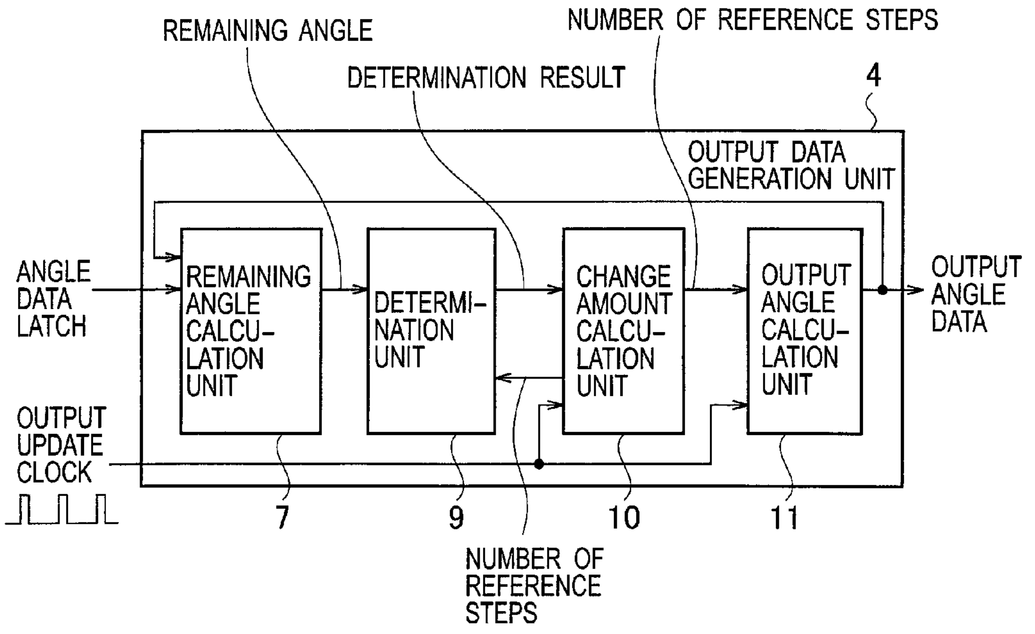
FIG. 2 is a block diagram illustrating a configuration of an output data generation unit according to the first embodiment of the present invention.
Figure 3A:
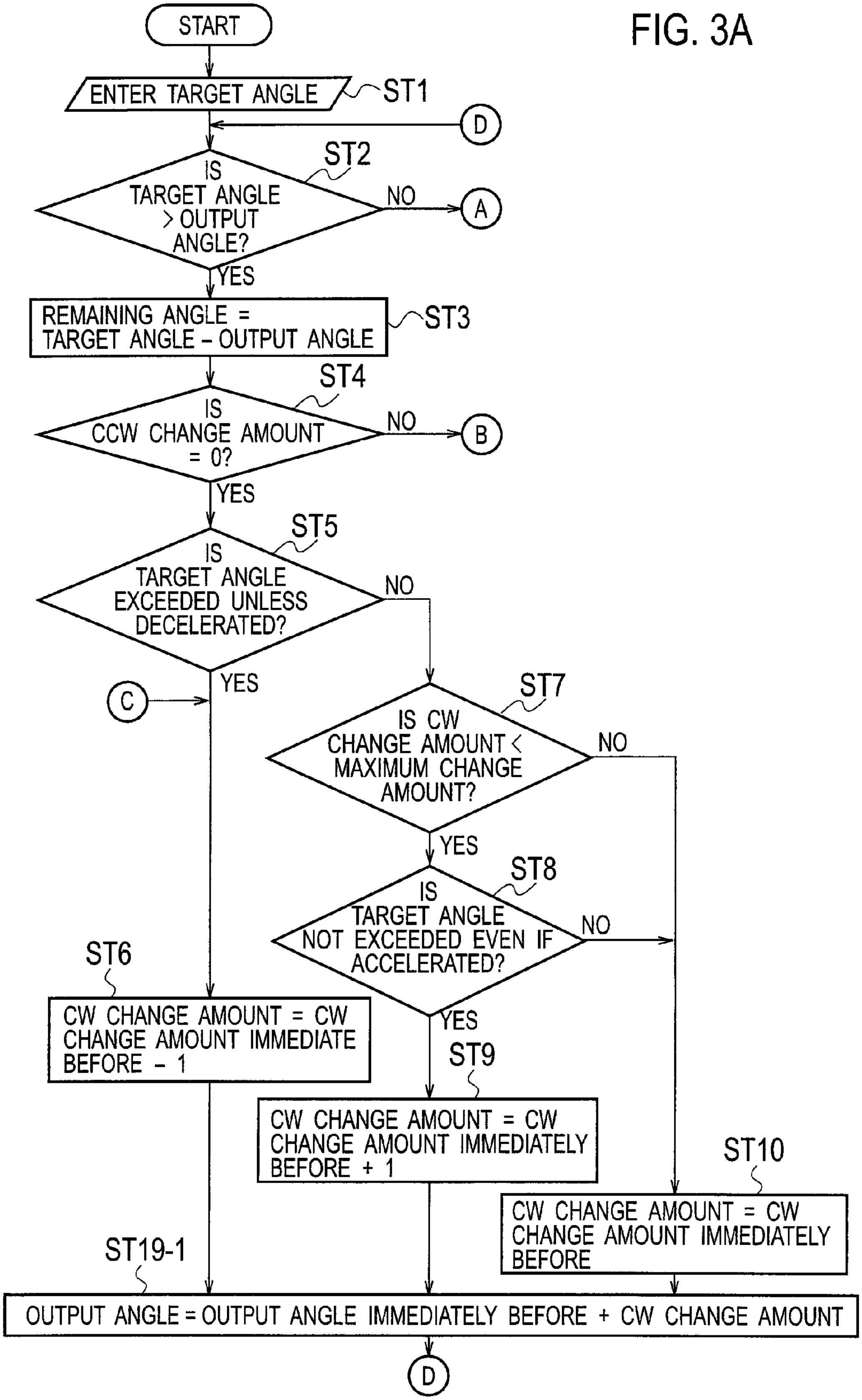
FIGS. 3A and 3B are a flowchart illustrating a processing procedure of the stepper motor control apparatus of the first embodiment of the present invention.
Figure 3B:
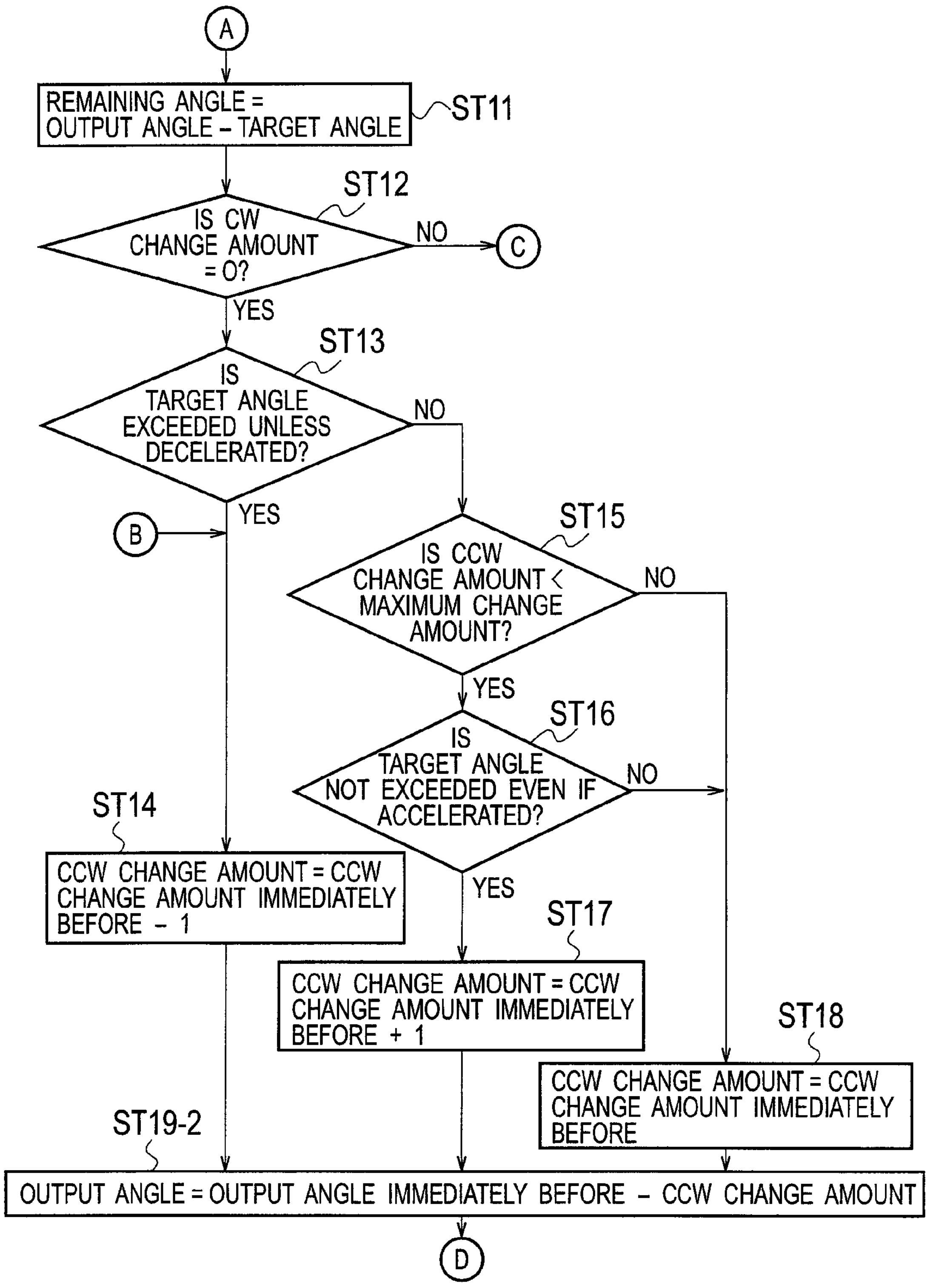

A first embodiment of the present invention will be described below with reference to the drawings. FIG. 1 is a block diagram illustrating a schematic configuration of a stepper motor control apparatus 1 according to the first embodiment of the present invention. FIG. 2 is a block diagram illustrating a configuration of an output data generation unit 4 included in the stepper motor control apparatus 1. FIGS. 3A and 3B are a flowchart illustrating a processing procedure executed by the output data generation unit 4.

In the description below, various angles (e.g., target angle, and output angle described below) take values in which a predetermined reference angle is 0 and a clockwise direction is a forward direction. Units of these angles are steps unless specified otherwise, and a size of one step is 0.5 (degrees).

The stepper motor control unit 1 is used for a vehicle speed motor, and includes a CPU, a ROM, and a RAM, realizing an input data latch unit 3, an output data generation unit 4, and an output signal generation unit 5. In other words, the stepper motor control apparatus 1 substantially includes the input data latch unit 3, the output data generation unit 4, and the output signal generation unit 5. A microcomputer 2 and a stepper motor 6 are connected to the stepper motor control apparatus 1. The microcomputer 2 is connected to a speed sensor 2*a*. According to the embodiment, the stepper motor control apparatus 1 is realized by software. However, the stepper motor control apparatus 1 may be realized by hardware (IC).

The output data generation unit 4 includes a remaining angle calculation unit 7, a determination unit 9, a change amount calculation unit 10, and an output angle calculation unit 11.

The speed sensor 2*a* detects a car speed to output a speed signal to the microcomputer 2. The microcomputer 2 calculates a target angle according to the car speed to output a target angle signal indicating the target angle to the stepper motor control apparatus 1.

The input data latch unit 3 holds the target angle signal supplied from the speed sensor 2*a* as target angle data. The output data generation unit 4 obtains the target angle data from the input data latch unit 3, and generates a reference step number data indicating the number of reference steps based on the target angle data. The number of reference steps provides a reference value for a rotational direction and a step amount of the stepper motor 6. In other words, a code of the number of reference steps indicates a rotational direction of the stepper motor 6, and an absolute value of the number of reference steps (step amount indicated by the number of reference steps) is a reference value for a rotational step amount of the stepper motor 6. A positive code indicates a forward direction (clockwise direction, CW direction), while a negative code indicates a reverse direction (counterclockwise direction, CCW direction). The absolute value of the number of reference steps is also referred to as a CW change amount when the number of reference steps is 0 or a positive value, and as a CCW change amount when the number of reference steps is 0 or a negative value. According to the first embodiment, the stepper motor 6 is rotated in a direction indicated by the number of reference steps by a step amount indicated by the number of reference steps. The output signal generation unit 5 generates a motor driving signal based on output angle data by accumulating the numbers of reference steps to output it to the stepper motor 6.

The stepper motor 6 is connected to a needle of a speed motor via a plurality of gears, and rotated to rotate the needle of the speed motor. When a rotational angle of the stepper motor 6 is the aforementioned reference angle, the needle of the speed motor points to 0. The stepper motor 6 is rotated, based on the motor driving signal, in the direction indicated by the number of reference steps and by the step amount indicated by the number of step amounts. For example, the stepper motor 6 is rotated by 5 steps in a reverse direction when the number of reference steps is −5.

The stepper motor control apparatus 1 also includes a timer (not shown). The timer outputs an output update clock signal to the change amount calculation unit 10 and the output angle calculation unit 11 for each passage of an update period. The update period is set to satisfy the following equation (4):

$$t \geqq (\theta k/a\_MAX)\hat{}(1/2) \quad (4),$$

where t is update period, θk is angle of 1 step, and a_MAX is maximum response acceleration of stepper motor 6. When maximum response acceleration of the stepper motor 6 is 5000 (degrees/s^2), a value of a right side of the equation (4) is 0.01 (s). Thus, an update period is set to 0.01 (s) or more.

Referring to the flowchart of FIGS. 3A and 3B, the processing procedure of the stepper motor control apparatus 1 will be described. Steps ST2 to ST19-1 or steps ST2 to ST19-2 constitute one processing cycle of the output data generation unit 4.

In step ST1, the remaining angle calculation unit 7 obtains target angle data from the input data latch unit 3.

In step ST2, the remaining angle calculation unit 7 determines conditions in which a target angle is larger than an output angle of a previous processing cycle based on target angle data obtained from the input data latch unit 3 and output angle data of the previous processing cycle supplied from the output angle calculation unit 11. The process proceeds to step ST3 if the conditions are satisfied, and to step ST11 if not. When no output angle data of the previous processing cycle is supplied from the output angle calculation unit 11, in other words, there is no output angle data of the previous processing cycle, the remaining angle calculation unit 7 determines conditions by setting an output angle of the previous processing cycle to 0.

In step ST3, the remaining angle calculation unit 7 subtracts the output angle from the target angle to calculate a remaining angle, and outputs remaining angle data indicating the remaining angle to the determination unit 9. Note, when there is no output angle data of the previous processing cycle, the remaining angle calculation unit 7 calculates remaining angle data by setting an output angle of the previous processing cycle to 0.

In step ST4, the determination unit 9 determines conditions in which a CCW change amount is 0, in other words, conditions in which the number of reference steps is 0 or a positive value, based on reference step number data of the previous processing cycle supplied from the change amount calculation unit 10. The process proceeds to step ST5 if the conditions are satisfied, and outputs a CCW decrease instruction signal to the change amount calculation unit 10 to proceed to step ST14 if not.

In step ST5, the determination unit 9 determines conditions in which the stepper motor 6 exceeds the target angle unless the stepper motor 6 is decelerated, specifically, conditions to satisfy the following equation (3):

$$|V(N-1)|*(|V(N-1)|+1)/2>|\mathrm{DISTANCE}| \quad (3),$$

where V(N−1) is number of reference steps of previous processing cycle, DISTANCE is a value obtained by subtracting output angle (angle obtained by accumulating numbers of reference steps obtained from start of processing shown in FIGS. 3A and 3B by output data generation unit 4 to end of previous processing cycle) of the previous processing cycle from the target angle of the stepper motor 6, and |DISTANCE| is a remaining angle.

The determination unit 9 outputs a CW decrease instruction signal to the change amount calculation unit 10 to proceed to step ST6 if the conditions are satisfied, and proceeds to step ST7 if not.

In step ST6, the change amount calculation unit 10 stands by until reception of an output update clock signal, and then sets a CW change amount of a current processing cycle to a value smaller by 1 than that of the previous processing cycle based on the CW decrease instruction signal supplied from the determination unit 9. Specifically, the change amount calculation unit 10 calculates the number of reference steps of the current processing cycle as a value smaller by 1 step than that of the previous processing cycle in an approaching direction in which a difference between an output angle of the previous processing cycle and a target angle of the stepper motor is reduced. The change amount calculation unit 10 outputs reference step number data of the current processing cycle indicating the number of reference steps of the current processing cycle to the output angle calculation unit 11. The change amount calculation unit 10 outputs reference step number data of the current processing cycle as reference step number data of the previous processing cycle to the determination unit 9. Then, the change amount calculation unit 10 proceeds to step ST19-1.

In step ST7, based on the reference step number data of the previous processing cycle and maximum change amount data, the determination unit 9 determines a condition in which the CW change amount does not exceed a maximum change amount, specifically, a condition to satisfy an equation (2) below:

$$|V(N-1)|<V\_\mathrm{MAX} \quad (2),$$

where V_MAX is a maximum change amount.

The maximum change amount data is stored in the determination unit 9. The maximum change amount is a maximum step amount by which the stepper motor 6 can be rotated at one update period. When a maximum response speed is 500 (degrees/s), the maximum change amount is 500/0.5*0.01=10 (steps).

The determination unit 9 proceeds to step ST8 if this condition is satisfied, and outputs a CW constant instruction signal to the change amount calculation unit 10 to proceed to step ST10 if not.

In step ST8, the determination unit 9 determines a condition not to exceed a target angle even if accelerated, specifically, a condition to satisfy an equation (1) below:

$$(|V(N-1)|+1)*(|V(N-1)|+2)/2\leqq|\mathrm{DISTANCE}| \quad (1).$$

The determination unit 9 outputs a CW increase instruction signal to the change amount calculation unit 10 to proceed to step ST9 if this condition is satisfied. The determination unit 9 outputs a CW constant instruction signal to the change amount calculation unit 10 to proceed to step ST10 if not.

In step ST9, the change amount calculation unit 10 stands by until reception of an output update clock signal, and then sets a CW change amount of the current processing cycle to a value larger by 1 than that of the previous processing cycle based on the CW increase instruction signal supplied from the determination unit 9. Specifically, the change amount calculation unit 10 calculates the number of reference steps of the current processing cycle as a value larger by 1 step than that of the previous processing cycle in the approaching direction. The change amount calculation unit 10 outputs reference step number data of the current processing cycle indicating the number of reference steps of the current processing cycle to the output angle calculation unit 11. The change amount calculation unit 10 outputs reference step number data of the current processing cycle as reference step number data of the previous processing cycle to the determination unit 9. Then, the change amount calculation unit 10 proceeds to step ST19-1.

In step ST10, the change amount calculation unit 10 stands by until reception of an output update clock signal, and then sets a CW change amount of the current processing cycle equal to the CW change amount of the previous processing cycle based on the output angle data of the previous processing cycle and the CW constant instruction signal supplied from the determination unit 9. Specifically, the change amount calculation unit 10 calculates the number of reference steps of the current processing cycle as a value equal to the number of reference steps of the previous processing cycle. The change amount calculation unit 10 outputs reference step number data of the current processing cycle indicating the number of reference steps of the current processing cycle to the output angle calculation unit 11. The change amount calculation unit 10 outputs reference step number data of the current processing cycle as reference step number data of the previous processing cycle to the determination unit 9. Then, the change amount calculation unit 10 proceeds to step ST19-1.

In step ST19-1, the change amount calculation unit 11 stands by until reception of an output update clock signal, and then adds the CW change amount of the current processing cycle to the output angle of the previous processing cycle to calculate an output angle of the current processing cycle. Specifically, the output angle calculation unit 11 adds the number of reference steps of the current processing cycle to the output angle of the previous processing cycle to calculate an output angle of the current processing cycle. The output angle calculation unit 11 outputs output angle data of the current processing cycle indicating an output angle of the current processing cycle to the remaining angle calculation unit 7 and the output signal generation unit 5. Then, the output angle calculation unit 11 returns to the step ST2.

In step ST11, the remaining angle calculation unit 7 subtracts a target angle from the output angle to calculate a remaining angle and output remaining angle data indicating the remaining angle to the determination unit 9. Processing when there is no data of the previous processing cycle is similar to the aforementioned processing.

In step ST12, the determination unit 9 determines a condition in which a CW change amount is 0, specifically, a condition in which the number of reference steps is 0 or a negative value, based on the reference step number data of the previous processing cycle. The determination unit 9 proceeds to step S13 if this condition is satisfied, and outputs a CW decrease instruction signal to the change amount calculation unit 10 to proceed to step ST6 if not.

In step ST13, the determination unit 9 determines a condition in which the stepper motor 6 exceeds the target value unless decelerated, specifically, a condition to satisfy the equation (3).

The determination unit 9 outputs a CCW decrease instruction signal to the change amount calculation unit 10 to proceed to step ST14 if this condition is satisfied, and to step ST15 if not.

In step ST14, the change amount calculation unit 10 stands by until reception of an output update clock signal, and then sets a CCW change amount of the current processing cycle to a value smaller by 1 than the CCW change amount of the previous processing cycle based on the CCW decrease instruction signal supplied from the determination unit 9. Specifically, the change amount calculation unit 10 calculates the number of reference steps of the current processing cycle as a value smaller by 1 step than the number of reference steps of the previous processing cycle in the approaching direction. The change amount calculation unit 10 outputs reference step number data of the current processing cycle indicating the number of reference steps of the current processing cycle to the output angle calculation unit 11. The change amount calculation unit 10 outputs reference step number data of the current processing cycle as reference step number data of the previous processing cycle to the determination unit 9. Then, the change amount calculation unit 10 proceeds to step ST19-2.

In step ST15, the determination unit 9 determines a condition in which a CCW change amount does not exceed a maximum change amount, specifically, a condition to satisfy the equation (2).

The determination unit 9 proceeds to step ST16 if this condition is satisfied, and outputs a CCW constant instruction signal to the change amount calculation unit 10 to proceed to step ST18 if not.

In step ST16, the determination unit 9 determines a condition in which the target angle is not exceeded even if accelerated, specifically, a condition to satisfy the equation (1).

The determination unit 9 outputs a CCW increase instruction signal to the change amount calculation unit 10 to proceed to step ST17 if this condition is satisfied, and outputs a CCW constant instruction signal to the change amount calculation unit 10 to proceed to step ST18 if not.

In step ST17, the change amount calculation unit 10 stands by until reception of an output update clock signal, and then sets a CCW change amount of the current processing cycle to a value larger by 1 than the CCW change amount of the previous processing cycle based on the CCW increase instruction signal supplied from the determination unit 9. Specifically, the change amount calculation unit 10 calculates the number of reference steps of the current processing cycle as a value larger by 1 step than the number of reference steps of the previous processing cycle in the approaching direction. The change amount calculation unit 10 outputs reference step number data of the current processing cycle indicating the number of reference steps of the current processing cycle to the output angle calculation unit 11. The change amount calculation unit 10 outputs reference step number data of the current processing cycle as reference step number data of the previous processing cycle to the determination unit 9. Then, the change amount calculation unit 10 proceeds to step ST19-2.

In step ST18, the change amount calculation unit 10 stands by until reception of an output update clock signal, and then sets a CCW change amount of the current processing cycle equal to the CCW change amount of the previous processing cycle based on the CCW constant instruction signal supplied from the determination unit 9. Specifically, the change amount calculation unit 10 calculates the number of reference steps of the current processing cycle as a value equal to the number of reference steps of the previous processing cycle. The change amount calculation unit 10 outputs reference step number data of the current processing cycle indicating the number of reference steps of the current processing cycle to the output angle calculation unit 11. The change amount calculation unit 10 outputs reference step number data of the current processing cycle as reference step number data of the previous processing cycle to the determination unit 9. Then, the change amount calculation unit 10 proceeds to step ST19-2.

In step ST19-2, the output angle calculation unit 11 stands by until reception of an output update clock signal, and then subtracts the CCW change amount of the current processing cycle from the output angle of the previous processing cycle to calculate an output angle of the current processing cycle. Specifically, the output angle calculation unit 11 adds the number of reference steps of the current processing cycle to the output angle of the previous processing cycle to calculate an output angle of the current processing cycle. The output angle calculation unit 11 outputs output angle data of the current processing cycle indicating the output angle of the current processing cycle to the remaining angle calculation unit 7 and the output signal generation unit 5. Then, the output angle calculation unit 11 returns to the step ST2.

Accordingly, the output data generation unit 4 outputs output angle data of the current processing cycle to the output signal generation unit 5 for each passage of the update period. In step ST2 and after of a next processing cycle, the data which the output angle calculation unit 11 has output to the remaining angle calculation unit 7 is treated as data of the previous processing cycle.

The output signal generation unit 5 generates, based on the output angle data of the current processing cycle, a motor driving signal (mainly PWM signal) indicating output angle to output it to the stepper motor 6. The stepper motor 6 is rotated by a step amount indicated by the number of reference steps in a direction indicated by the number of reference steps based on the motor driving signal.

Figure 4:
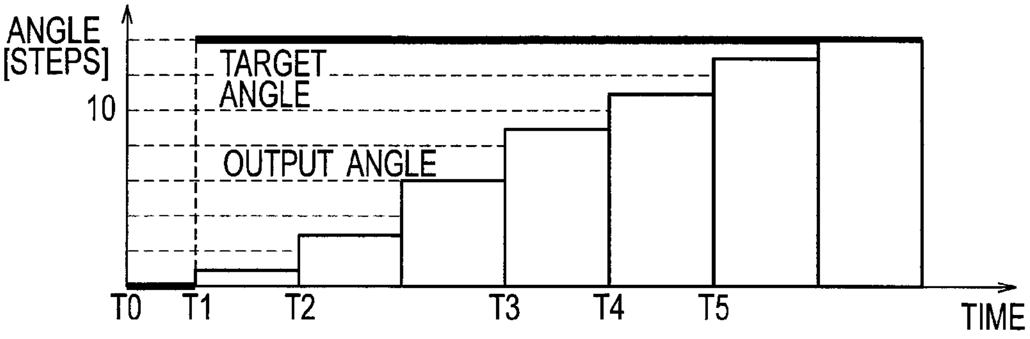
FIG. 4 is a characteristic diagram illustrating a situation of a change in output angle according to the first embodiment.

Next, a specific example of a change of an output angle will be described. A maximum change amount is 10 (steps). In an example of FIG. 4, a target angle is 0 (step) at time T0 to T1, and 14 (steps) at time T1.

In this case, a target angle is 14, and an output angle of the previous processing cycle is 0 at the time T1. Thus, the stepper motor control apparatus 1 proceeds from step ST2 to step ST3 to calculate a remaining angle as 14. As the number of reference steps of the previous processing cycle is 0, the stepper motor control apparatus 1 proceeds from step ST4 to step ST5.

Because of $0*(0+1)/2<14$ according to the equation (3), the stepper motor control apparatus 1 proceeds from step ST5 to step ST7. Because of $0<10$ according to the equation (2), the stepper motor control apparatus 1 proceeds from step ST7 to step ST8. Because of $(0+1)*(0+2)/2<14$ according to the equation (1), the stepper motor control apparatus 1 proceeds from step ST8 to step ST9 to calculate the number of reference steps of the current processing cycle as 0+1=1. The stepper motor control apparatus 1 further proceeds from step ST9 to step ST19-1 to calculate an output angle of the current processing cycle as 0+1=1.

At time T2 which is a next update timing, as a target angle is 14 and an output angle of the previous processing cycle is 1, the stepper motor control apparatus 1 proceeds from step ST2 to step ST3 to calculate a remaining angle as 13. Because the number of reference steps of the previous processing cycle is 1, the stepper motor control apparatus 1 proceeds from step ST4 to step ST5.

Because of 1*(1+1)/2<13 according to the equation (3), the stepper motor control apparatus 1 proceeds from step ST5 to step ST7. Because of 1<10 according to the equation (2), the stepper motor control apparatus 1 proceeds from step ST7 to step ST8. Because of (1+1)*(1+2)/2<13 according to the equation (1), the stepper motor control apparatus 1 proceeds from step ST8 to step ST9 to calculate the number of reference steps of the current processing cycle as 1+1=2. The stepper motor control apparatus 1 further proceeds from step ST9 to step ST19-1 to calculate an output angle of the current processing cycle as 1+2=3.

At time T3, as a target angle is 14 and an output angle of the previous processing cycle is 6, the stepper motor control apparatus 1 proceeds from step ST2 to step ST3 to calculate a remaining angle as 8. Because the number of reference steps of the previous processing cycle is 3, the stepper motor control apparatus 1 proceeds from step ST4 to step ST5.

Because of 3*(3+1)/2<8 according to the equation (3), the stepper motor control apparatus 1 proceeds from step ST5 to step ST7. Because of 3<10 according to the equation (2), the stepper motor control apparatus 1 proceeds from step ST7 to step ST8. Because of (3+1)*(3+2)/2>8 according to the equation (1), the stepper motor control apparatus 1 proceeds from step ST8 to step ST10 to calculate the number of reference steps of the current processing cycle as 3. The stepper motor control apparatus 1 further proceeds from step ST10 to step ST19-1 to calculate an output angle of the current processing cycle as 6+3=9.

At time T4, as a target angle is 14 and an output angle of the previous processing cycle is 9, the stepper motor control apparatus 1 proceeds from step ST2 to step ST3 to calculate a remaining angle as 5. Because the number of reference steps of the previous processing cycle is 3, the stepper motor control apparatus 1 proceeds from step ST4 to step ST5.

Because of 3*(3+1)/2<5 according to the equation (3), the stepper motor control apparatus 1 proceeds from step ST5 to step ST6 to calculate the number of reference steps of the current processing cycle as 3−1=2. The stepper motor control apparatus 1 further proceeds from step ST6 to step ST19-1 to calculate an output angle of the current processing cycle as 9+2=11.

At time T5, as a target angle is 14 and an output angle of the previous processing cycle is 11, the stepper motor control apparatus 1 proceeds from step ST2 to step ST3 to calculate a remaining angle as 3. Because the number of reference steps of the previous processing cycle is 2, the stepper motor control apparatus 1 proceeds from step ST4 to step ST5.

Because of 2*(2+1)/2=3 according to the equation (3), the stepper motor control apparatus 1 proceeds from step ST5 to step ST7. Because of 2<10 according to the equation (2), the stepper motor control apparatus 1 proceeds from step ST7 to step ST8. Because of (2+1)*(2+2)/2>3 according to the equation (1), the stepper motor control apparatus 1 proceeds from step ST8 to step ST10 to calculate the number of reference steps of the current processing cycle as 2. The stepper motor control apparatus 1 further proceeds from step ST10 to step ST19-1 to calculate an output angle of the current processing cycle as 11+2=13.

Figure 5:
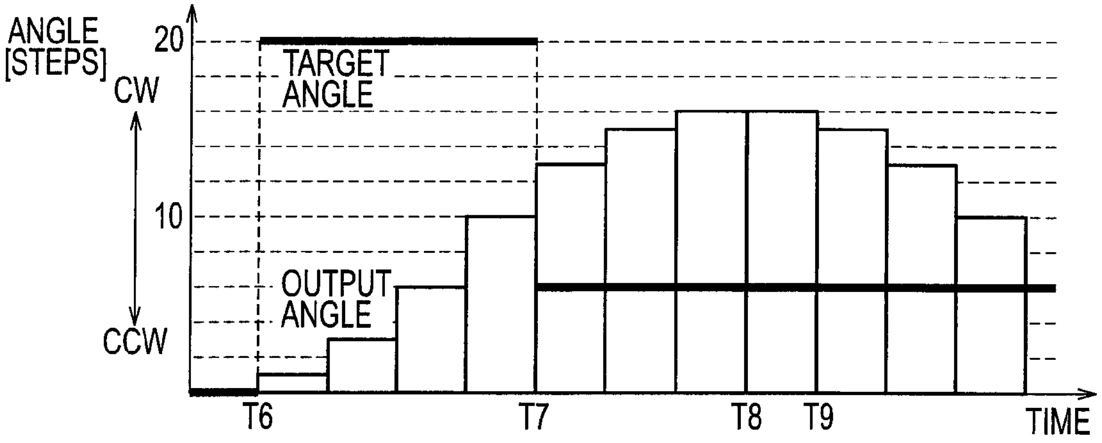
FIG. 5 is a characteristic diagram illustrating a situation of a change in output angle according to the first embodiment.
Figure 6:
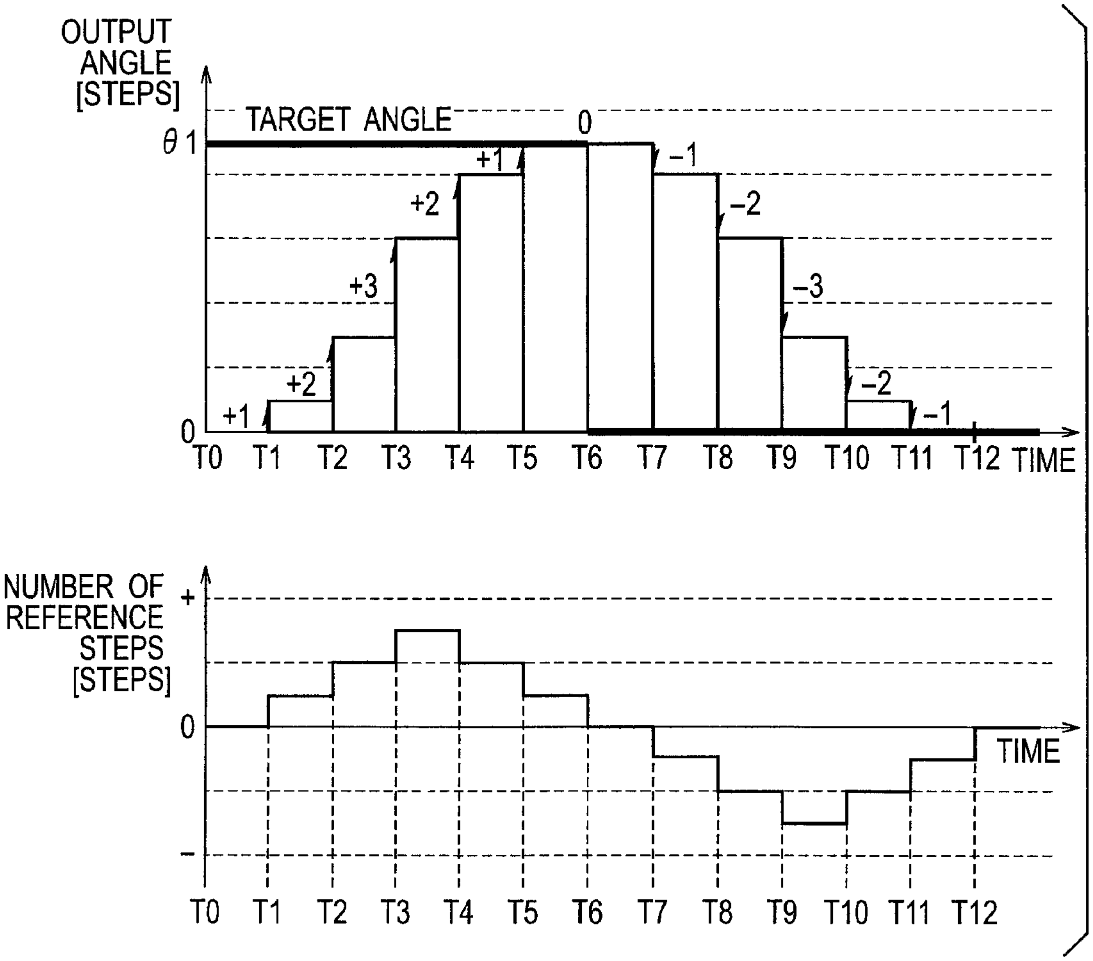
FIG. 6 is a characteristic diagram illustrating a situation of a change in output angle according to the first embodiment.

In an example of FIG. 5, a target angle is 20 (steps) at time T6, and 6 (steps) at time T7.

At time T7, as the target angle is 6 and an output angle of the previous processing cycle is 10, the stepper motor control apparatus 1 proceeds from step ST2 to step ST11 to calculate a remaining angle as 4. Because the number of reference steps of the previous processing cycle is 4, the stepper motor control apparatus 1 proceeds from step ST12 to step ST6 to calculate the number of reference steps of the current processing cycle as 4−1=3. The stepper motor control apparatus 1 further proceeds from step ST6 to step ST19-1 to calculate an output angle of the current processing cycle as 10+3=13.

At time T8, as a target angle is 6 and an output angle of the previous processing cycle is 16, the stepper motor control apparatus 1 proceeds from step ST2 to step ST11 to calculate a remaining angle as 10. Because the number of reference steps of the previous processing cycle is 1, the stepper motor control apparatus 1 proceeds from step ST12 to step ST6 to calculate the number of reference steps of the current processing cycle as 1−1=0. The stepper motor control apparatus 1 proceeds from step ST6 to step ST19-1 to calculate an output angle of the current processing cycle as 16+0=16.

At time T9, as a target angle is 6 and an output angle of the previous processing cycle is 16, the stepper motor control apparatus 1 proceeds from step ST2 to step ST11 to calculate a remaining angle as 10. Because the number of reference steps of the previous processing cycle is 0, the stepper motor control apparatus 1 proceeds from step ST12 to step ST13.

Because of 0*(0+1)/2<10 according to the equation (3), the stepper motor control apparatus 1 proceeds from step ST13 to step ST15. Because of 0<10 according to the equation (2), the stepper motor control apparatus 1 proceeds from step ST15 to step ST16. Because of (0+1)*(0+2)/2<10 according to the equation (1), the stepper motor control apparatus 1 proceeds from step ST16 to step ST17 to calculate the number of reference steps of the current processing cycle as 0−1=−1 (CCW change amount=1). The stepper motor control apparatus 1 further proceeds from step ST17 to step ST19-2 to calculate an output angle of the current processing cycle as 16−1=15.

Figure 7:
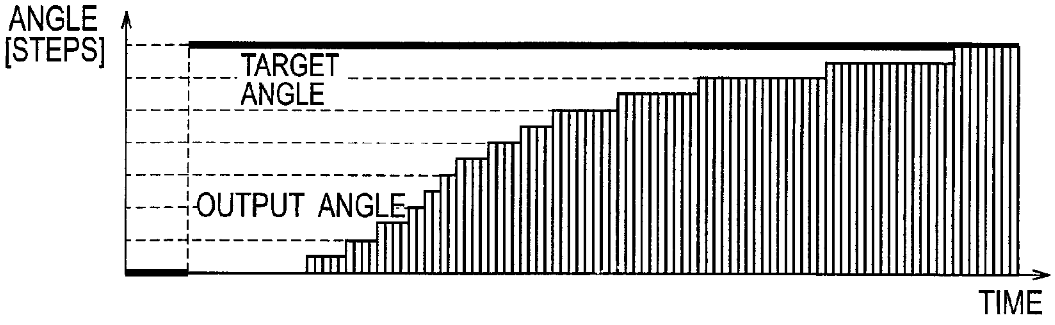
FIG. 7 is a characteristic diagram illustrating a situation of a change in output angle according to a conventional technology.
Figure 8:
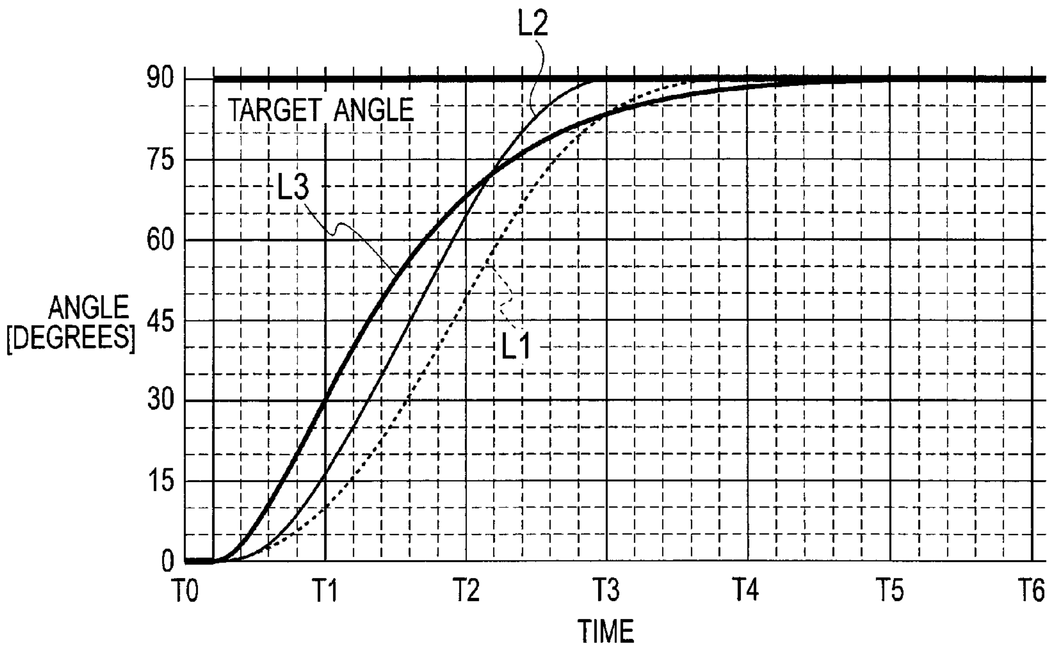
FIG. 8 is a characteristic diagram illustrating a relation among an output angle of the first embodiment, an output angle of the conventional technology, and a maximum response of a stepper motor.
Figure 9:
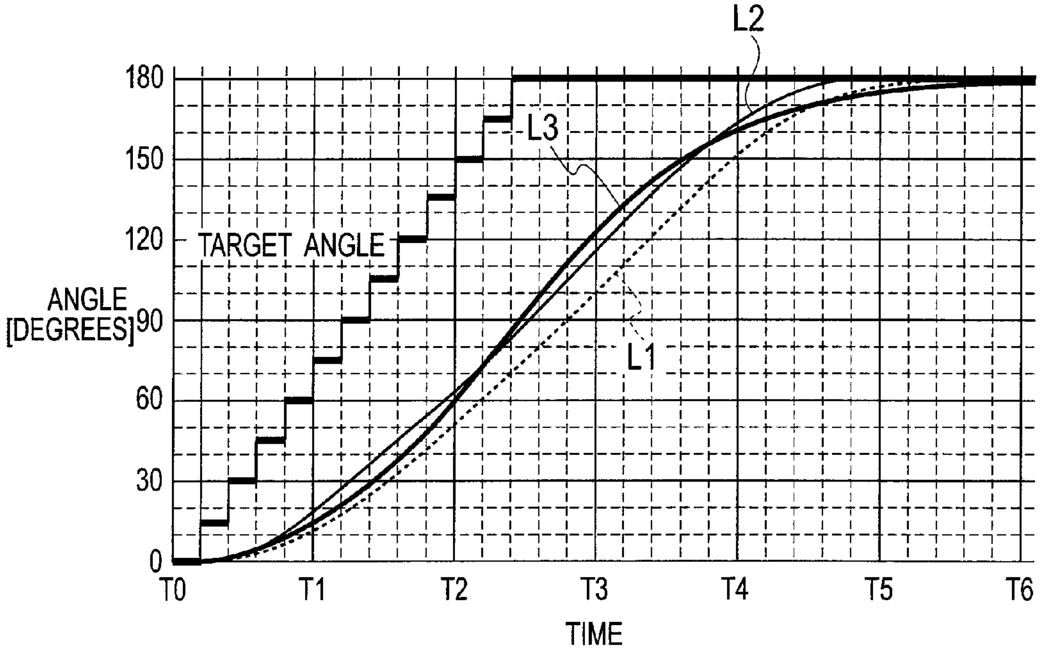
FIG. 9 is a characteristic diagram illustrating a relation among an output angle of the first embodiment, an output angle of the conventional technology, and a maximum response of the stepper motor.

Next, the stepper motor control apparatus 1 and the related art described in the Patent Document 1 will be described in comparison. FIG. 7 illustrates a target angle at each time and an output angle of the Patent Document 1. FIGS. 8 and 9 illustrate a target angle at each time, an output angle of the Patent Document 1, an output angle of the stepper motor control apparatus 1, and a maximum response of the stepper motor 6. Note, a size of one step is 0.0521 (degrees), a maximum response speed is 500 (degrees/s), maximum response acceleration is 5000 (degrees/s^2), and an update period of the stepper motor control apparatus 1 is 4.096 (ms), for example. A curve L1 indicates an output angle of the stepper motor control apparatus 1 at each time, a curve L2 indicates a maximum response of the stepper motor 6 at each time, and a curve L3 indicates an output angle of the Patent Document 1 at each time. The maximum response of the stepper motor 6 is a rotational angle of the stepper motor 6 when it is rotated at its maximum response speed and maximum response acceleration. Accordingly, when a curve indicating a relation between an output angle and each time is arranged above the curve L2, the output angle exceeds the maximum response of the stepper motor 6. Thus, the stepper motor 6 may step out.

As obvious from FIG. 8, the output angle of the Patent Document 1 exceeds the maximum response of the stepper motor 6. However, the output angle of the stepper motor control apparatus 1 does not exceed the maximum response of the stepper motor 6. Besides, the output angle of the stepper motor control apparatus 1 reaches a target angle faster than the output angle of the Patent Document 1. This relation does not change even when a target angle is constant (FIG. 8), or when a target angle changes with a passage of time (FIG. 9).

A reason why the output angle of the stepper motor control apparatus 1 does not exceed the maximum response of the stepper motor 6 is as follows. With each passage of an update period, the number of reference steps changes. However, an amount of one change is limited to ±one steps. The change in the number of reference steps means acceleration or deceleration of the stepper motor 6. Specifically, an increase of the number of reference steps by one step in an approaching direction causes acceleration of the stepper motor 6. A decrease of the number of reference steps by one step in the approaching direction causes deceleration of the stepper motor 6. Thus, acceleration ak (or deceleration bk, similar hereinafter) when the number of reference steps is changed once satisfies an equation (6) below:

$$|ak|=\theta k/(t^2) \qquad (6).$$

The update period (=t) satisfies the equation (4). Thus, a size of the acceleration ak never exceeds the maximum response acceleration of the stepper motor 6.

When the number of reference steps of the previous processing cycle is equal to or more than a maximum response change amount (maximum change amount), the stepper motor 6 is not accelerated (step ST7). When the stepper motor 6 is rotated at the maximum response speed, the stepper motor 6 is rotated by the maximum response change amount for one update period. Accordingly, the maximum response change amount corresponds to the maximum response speed of the stepper motor 6. In other words, if the number of reference steps is controlled not to exceed the maximum response change amount by using the equation (2), the stepper motor 6 is rotated at a speed equal to or less than the maximum response speed.

Accordingly, as the stepper motor 6 is rotated at a speed not exceeding the maximum response speed, and at acceleration not exceeding the maximum response acceleration, an output angle of the stepper motor control apparatus 1 does not exceed the maximum response of the stepper motor 6.

Thus, the stepper motor control apparatus 1 can prevent stepping-out of the stepper motor 6 more surely than the conventional stepper motor control apparatus 1. Moreover, the stepper motor control apparatus 1 enables an output angle to reach a target angle faster than the conventional stepper motor apparatus.

As shown in FIG. 5, when a change in target angle changes rotation of the stepper motor 6 to the rotation in a separation direction, the stepper motor control apparatus 1 decreases the number of reference steps one by one in the separation direction (refer to processing at time T7 to T8). The separation direction is reverse to the approaching direction.

Accordingly, when the stepper motor 6 is rotated in the separation direction, the stepper motor control apparatus 1 gradually decelerates, rather than suddenly stopping or rotating the stepper motor 6 in the approaching direction, the stepper motor 6 to rotate it in the approaching direction. Thus, stepping-out of the stepper motor 6 can be prevented more surely than the conventional stepper motor control apparatus.

Second Embodiment

Next, a difference of a second embodiment from the first embodiment will be described. A stepper motor control apparatus 1 of the second embodiment carries out the following process. In step ST1 of FIG. 3A, a remaining angle calculation unit 7 obtains target angle data from an input data latch unit 3. The remaining angle calculation unit 7 multiplies a target angle indicated by the target angle data by x (x: optional natural number) to calculate a target angle for control. Then, an output data generation unit 4 carriers out a process of step ST2 and after based on the target angle for control. In other words, the output data generation unit 4 substitutes "target angle of stepper motor 6" of the step ST2 and after with "target angle for control" to carry out the process of the step ST2 and after.

An output angle calculation unit 11 multiplies output angle data of a current processing cycle by 1/x (rounded down after decimal point) to calculate driving angle data, and outputs a motor driving signal indicating the driving angle data to the stepper motor 6 via an output signal generation unit 5.

The stepper motor 6 is rotated, based on the motor driving signal, by a step amount indicated by the number of reference steps (1/x (rounded down after decimal point) of absolute value of the number of reference steps) in a direction indicated by the number of reference steps.

Figure 10:
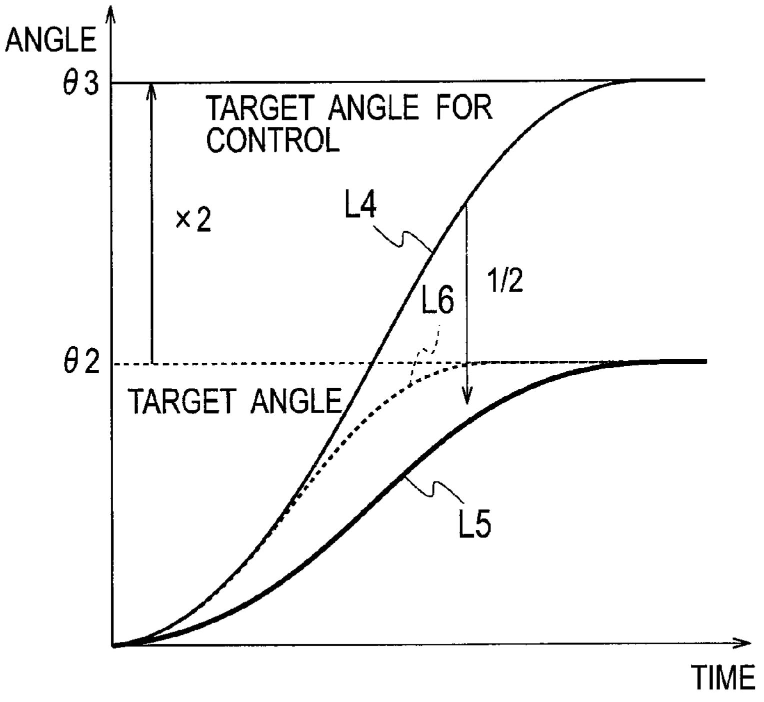
FIG. 10 is a characteristic diagram illustrating a situation of a change in output angle according to a second embodiment.

FIG. 10 illustrates a change in each data in the case of x=2, in which a target angle calculated by a microcomputer 2 is θ2, and a target angle for control is θ3 (=2*θ2). A curve L4 indicates an output angle at each time according to the second embodiment, a curve L5 indicates a rotational angle of the stepper motor 6 at each time, and a curve L6 is an output angle at each time according to the first embodiment.

The stepper motor control apparatus 1 of the second embodiment can easily and optionally realize a movement smoother than that of the stepper motor control apparatus of the first embodiment by changing a value of x.

Moreover, by simultaneously setting a maximum change amount to a value larger by x times, the stepper motor control apparatus 1 of the second embodiment can make smooth a start and an end of rotation at a maximum speed not different from that of the stepper motor control apparatus 1 of the first embodiment.

Third Embodiment

Next, a difference of a third embodiment from the first embodiment will be described. A stepper motor control apparatus 1 of the third embodiment carries out the following process. An output angle calculation unit 11 carries out a process of calculating driving angle data by multiplying output angle data of a current processing cycle by 1/n (n: optional natural number) (rounded down after decimal point) at a period larger by 1/n times than an update cycle, and outputs a motor driving signal indicating the driving angle data to a stepper motor 6 via an output signal generation unit 5 at a period larger by 1/n than the update period. The stepper motor 6 is rotated, based on the motor driving signal, by 1/n (rounded down after decimal point) of a step amount indicated by the number of reference steps in a direction indicated by the number of reference steps.

Figure 11:
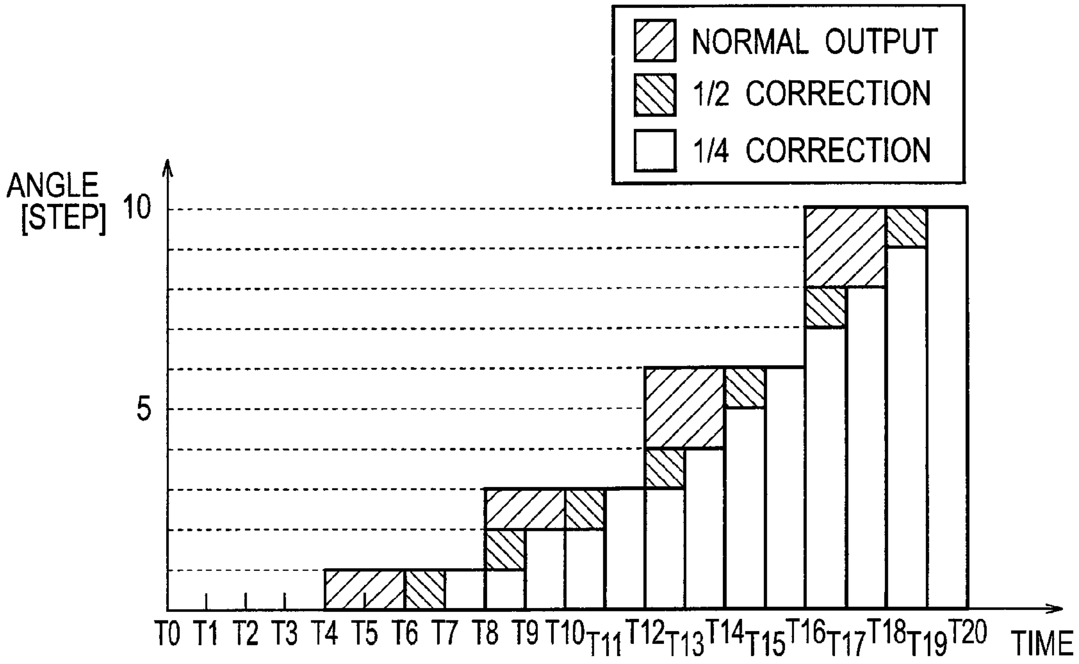
FIG. 11 is a characteristic diagram illustrating a relation between an output angle of a third embodiment and an output angle of the first embodiment.

FIG. 11 illustrates a rotational angle of the stepper motor 6 in the cases of n=2 and 4. A normal output indicates a rotational angle of the stepper motor 6 of the first embodiment, ½ correction indicates a rotational angle of the stepper motor 6 in the case of n=2, and ¼ correction indicates a rotational angle of the stepper motor 6 in the case of n=4. FIG. 12 illustrates a table form of FIG. 11. The number of reference steps is a value of a current processing cycle.

The stepper motor control apparatus 1 of the third embodiment has a shorter period of updating the rotational angle of the stepper motor 6 and a smaller rotational amount of the stepper motor 6 per one rotation than the first stepper motor control apparatus 1 of the first embodiment. Accordingly, stable rotation can be realized even if characteristics of the stepper motor 6 slightly fluctuate. As a result, the stepper motor control apparatus 1 of the third embodiment can prevent stepping-out of the stepper motor 6 more surely than the stepper motor control apparatus 1 of the first embodiment.

Fourth Embodiment

Figure 13A:
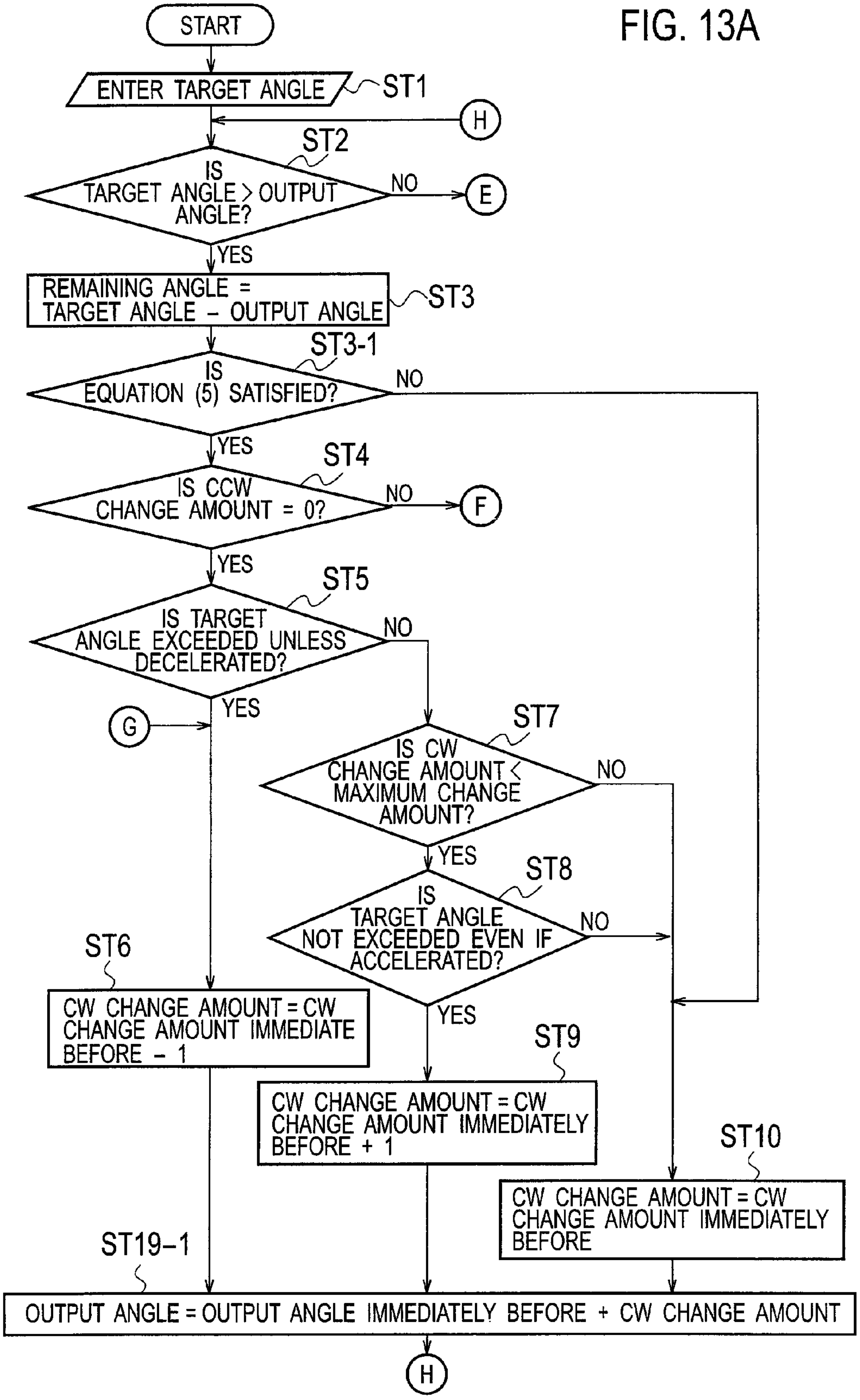
FIGS. 13A and 13B are a flowchart illustrating a processing procedure of a stepper motor control apparatus according to a fourth embodiment of the present invention.
Figure 13B:
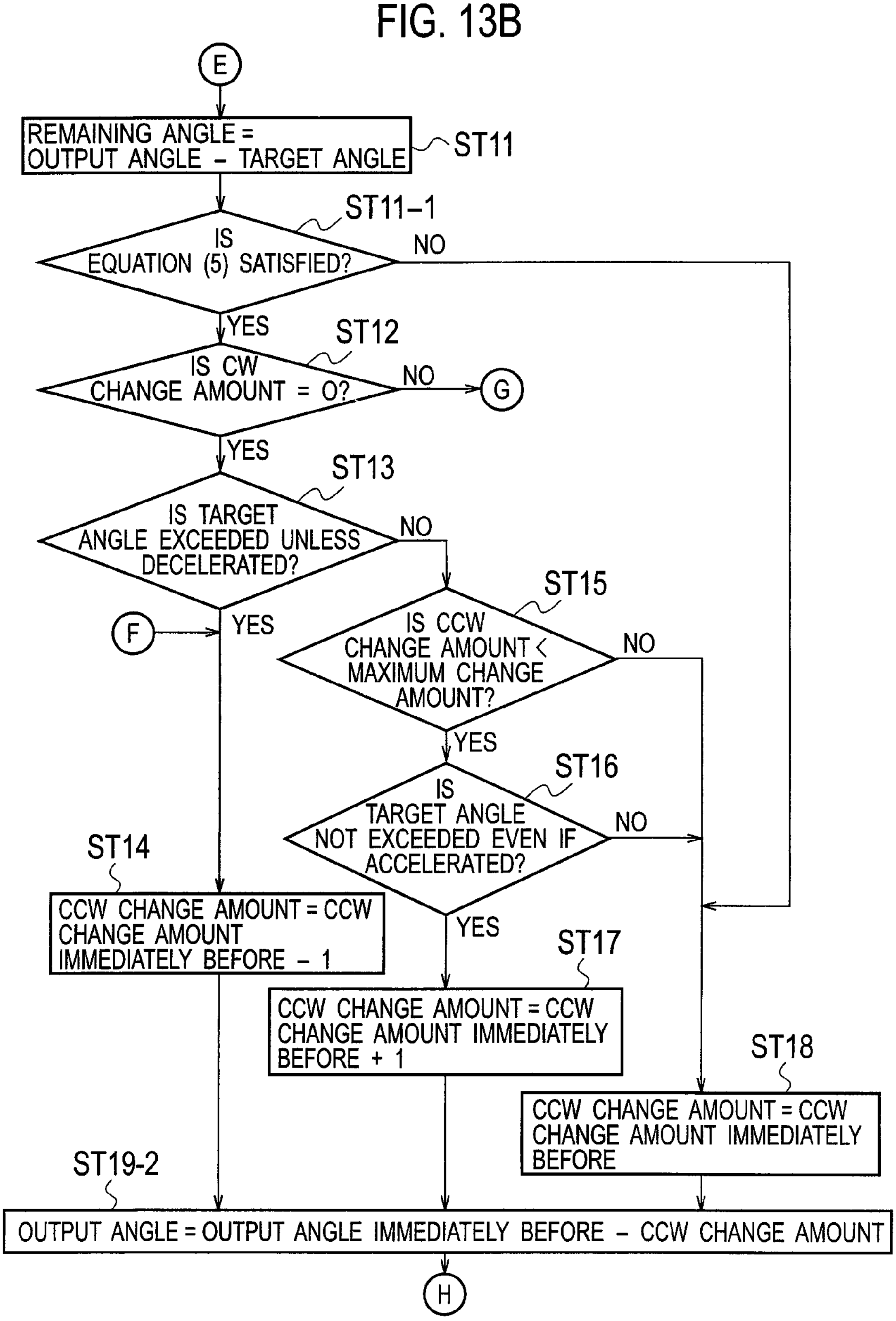

Next, a difference of a fourth embodiment from the first embodiment will be described. FIGS. 13A and 13B are a flowchart illustrating a processing procedure carried out by an output data generation unit 4 of the fourth embodiment. This flowchart includes step ST3-1 and step ST11-1 in addition to those of the flowchart of FIGS. 3A and 3B.

In step ST3-1, a remaining angle calculation unit 7 determines a condition to satisfy an equation (5) below, and proceeds to step ST4 if the condition is satisfied, and to step ST10 if not.

$$|DISTANCE|/|V(N-1)|>y \quad (5),$$

where y is an optional natural number.

In step ST11-1, the remaining angle calculation unit 7 determines a condition to satisfy the equation (5), and proceeds to step ST12 of the condition is satisfied, and to ST18 if not.

Figure 14:
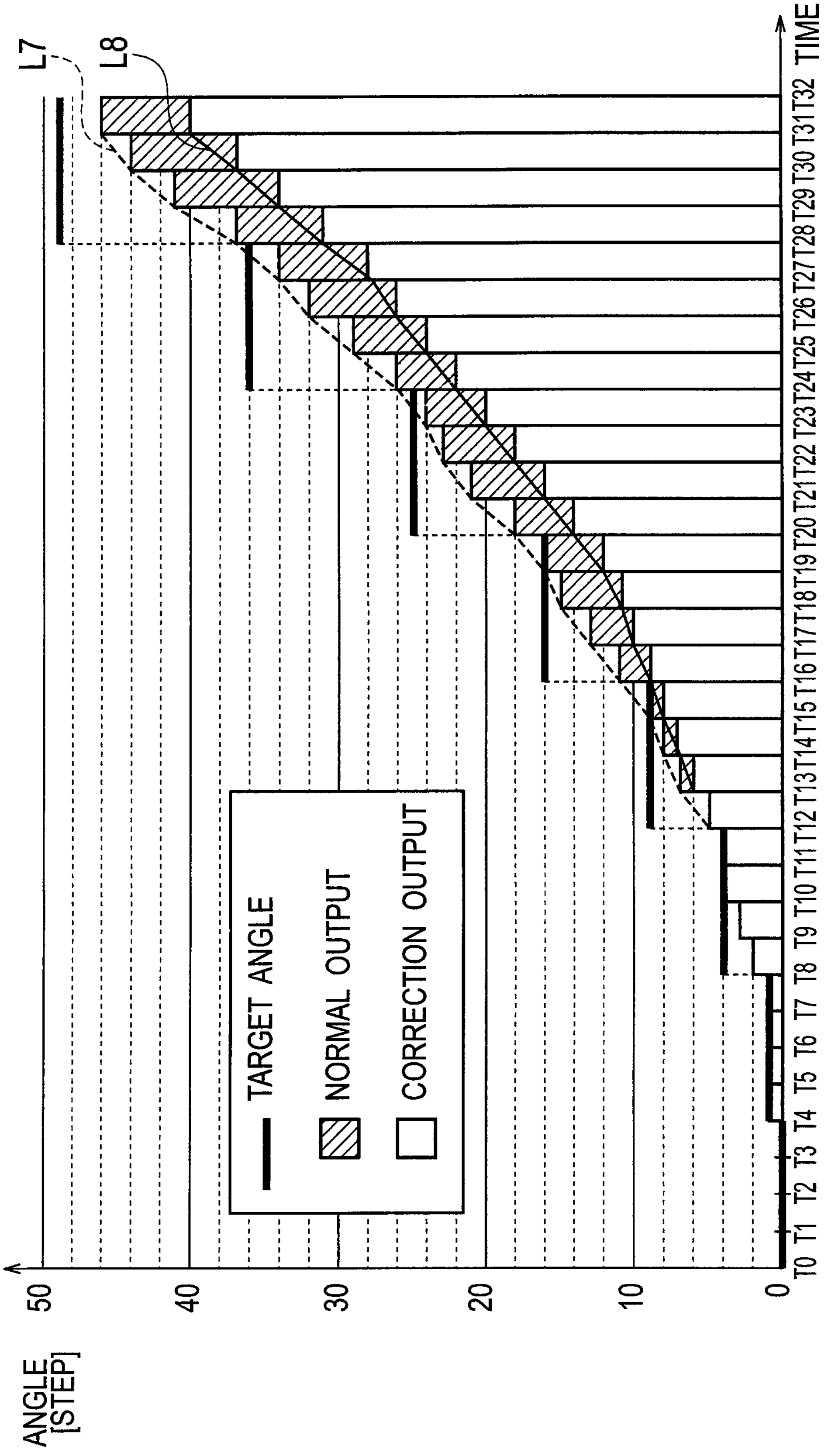
FIG. 14 is a characteristic diagram illustrating a relation between an output angle of the fourth embodiment and an output angle of the first embodiment.

FIGS. 14 and 15 illustrate an output angle of the fourth embodiment at each time and an output angle of the first embodiment at each time in comparison. In this case, y is 8. A normal output indicates an output angle of the first embodiment, and a correction output indicates an output angle of the fourth embodiment. A broken line L7 indicates a situation of a change in output angle of the first embodiment, and a broken line L8 indicates a situation of a change in output angle of the fourth embodiment. An increase of the number of reference steps means an increase of a CW change amount, and a decrease of the number of reference steps means a decrease of a CW change amount.

For example, at time T13, because of a remaining angle (=|DISTANCE|)=4 and the number of reference steps of a previous processing cycle=1, the equation (5) is not satisfied. Accordingly, the number of reference steps of a current processing cycle and the number of reference steps of the previous processing cycle are equal to each other in value.

At time T20, because of a remaining angle (=|DISTANCE|)=13 and the number of reference steps of the previous processing cycle=1, the equation (5) is satisfied. Accordingly, the same process as that of the first embodiment is carried out to increase the number of reference steps by 1 in a forward direction.

Similarly, at time T28, because of a remaining angle (=|DISTANCE|)=21 and the number of reference steps of the previous processing cycle=2, the equation (5) is satisfied. Accordingly, the same process as that of the first embodiment is carried out to increase the number of reference steps by 1 in the forward direction.

If the equation (5) is not satisfied, the number of reference steps is not changed. Thus, the stepper motor control apparatus 1 of the fourth embodiment can rotate the stepper motor 6 more smoothly than the stepper motor control apparatus 1 of the first embodiment.

Especially, almost no fluctuation in a target angle (e.g., a change amount of the target angle within a fixed period is within ±10 steps) is desirable. It is because as a changing frequency of the number of reference steps is lower, an operation of the stepper motor 6 is more stable. Thus, the stepper motor control apparatus 1 of the fourth embodiment is particularly useful when almost no fluctuation occurs in target angle.

The embodiments can be changed without departing from the teachings of the present invention. For example, values of x, n and y are not limited to the aforementioned examples. A size of one step and an update period are optionally set within satisfaction of the equation (4). The stepper motor control apparatus 1 and the stepper motor 6 can be used for purposes other than the speed meter (e.g., tachometer).

What is claimed is:

1. A stepper motor control apparatus comprising:

condition determination device determining a first condition to satisfy both of equations (1) and (2) below, and a second condition to satisfy an equation (3) below;

reference step number calculation device calculating, if the first condition is satisfied, the number of reference steps which is a reference value for a rotational direction and a step amount of a stepper motor as a value larger by one step than the number of reference steps of a previous processing cycle in an approaching direction in which a difference between an angle obtained by accumulating the numbers of reference steps and a target angle of the stepper motor is reduced, calculating, if the second condition is satisfied, the number of reference steps as a value smaller by one step than the number of reference steps of the previous processing cycle in the approaching direction, and calculating, if neither of the first and second conditions is satisfied, the number of reference steps as a value equal to the number of reference steps of the previous processing cycle, for each passage of an update period which satisfies an equation (4) below;

$$(|V(N-1)|+1)*(|V(N-1)|+2)/2 \leqq |DISTANCE| \quad (1),$$

$$|V(N-1)|<V\_MAX \quad (2),$$

$$|V(N-1)|*(|V(N-1)|+1)/2>|DISTANCE| \quad (3),$$

$$t \geqq (\theta k/a\_MAX)\hat{}(½) \quad (4),$$

where V(N−1) is number of reference stops of previous processing cycle, DISTANCE is a value obtained by subtracting angle obtained by accumulating numbers of reference steps from target angle of stepper motor and represented by step unit, V_MAX is a maximum step amount which enables rotation of stepper motor at one update period, t is an update period, θk is an angle of one step, a_MAX is maximum response acceleration of stepper motor;

and stepper motor driving device rotating, for each passage of the update period, the stepper motor by a step amount indicated by the number of reference steps of a current processing cycle in a direction indicated by the number of reference steps of the current processing cycle.

2. The stepper motor control apparatus according to claim 1, wherein the first condition requires stopping or rotation of the stepper motor in the approaching direction, and satisfaction of both of the equations (1) and (2), and the second condition requires stopping or rotation of the stepper motor in the approaching direction, and satisfaction of the equation (3).

3. The stepper motor control apparatus according to claim 1, further comprising target angle setting device setting a target angle for control by multiplying a target angle of the stepper motor entered from the outside by x (x: optional natural number), wherein:

the condition determination means determines the first and second conditions based on the target angle for control set by the target angle setting means;

the reference step number calculation means carries out the calculation of the number of reference steps based on the target angle for control set by the target angle setting means; and the stepper motor driving means calculates driving angle data by multiplying output angle data of the current processing cycle by 1/x, and rotates the stepper motor by 1/x of the step amount indicated by the number of reference steps in the direction indicated by the number of reference steps.

4. The stepper motor control apparatus according to claim 1, wherein the stepper motor driving means calculates, by multiplying output angle data of the current processing cycle by 1/n (n: optional natural number), at a period larger by 1/n than the update period, and rotates, for each passage of time longer by 1/n than the update period, the stepper motor by 1/n of the step amount indicated by the number of reference steps in the direction indicated by the number of reference steps.

5. The stepper motor control apparatus according to claim 1, wherein the first and second conditions include a condition of satisfying an equation (5) below:

$$|\mathrm{DISTANCE}|/|V(N-1)|>y \quad (5),$$

where y is an optional natural number.

* * * * *

UNITED STATES PATENT AND TRADEMARK OFFICE

CERTIFICATE OF CORRECTION

PATENT NO. : 7,839,111 B2
APPLICATION NO. : 12/177759
DATED : November 23, 2010
INVENTOR(S) : Saki Kojima It is certified that error appears in the above-identified patent and that said Letters Patent is hereby corrected as shown below:

In claim 1, column 14, line 44, "reference stops" should read --reference steps--.

Signed and Sealed this
Twenty-second Day of February, 2011

David J. Kappos
*Director of the United States Patent and Trademark Office*